Aug. 15, 1950 J. B. PETERS 2,518,929
PORTABLE LATHE
Filed Jan. 31, 1947 2 Sheets-Sheet 1

Inventor:
James B. Peters.
By Emery, Booth, Townsend, Miller & Whidden
Attys

Patented Aug. 15, 1950

2,518,929

UNITED STATES PATENT OFFICE 2,518,929

PORTABLE LATHE

James B. Peters, Lynn, Mass.

Application January 31, 1947, Serial No. 725,706

1 Claim. (Cl. 82—4)

This invention relates to portable lathes and is concerned with a novel and improved lathe to be mounted on a pipe flange and to turn the end of the pipe. One feature of the invention is an arrangement for supporting the lathe on the pipe flange in such manner that the lathe spindle can be adjusted lengthwise, laterally, and angularly to bring its axis into coincidence with the pipe axis and to move the spindle lengthwise of the axis. Another feature is an arrangement for supporting the tool carrier on the spindle and for guiding and feeding the same radially and automatically with each revolution of the tool carrier. Still other features will be pointed out during the course of the following description of one embodiment of the invention shown in the drawings, while its scope will be pointed out more particularly in the appended claim.

Figure 1:
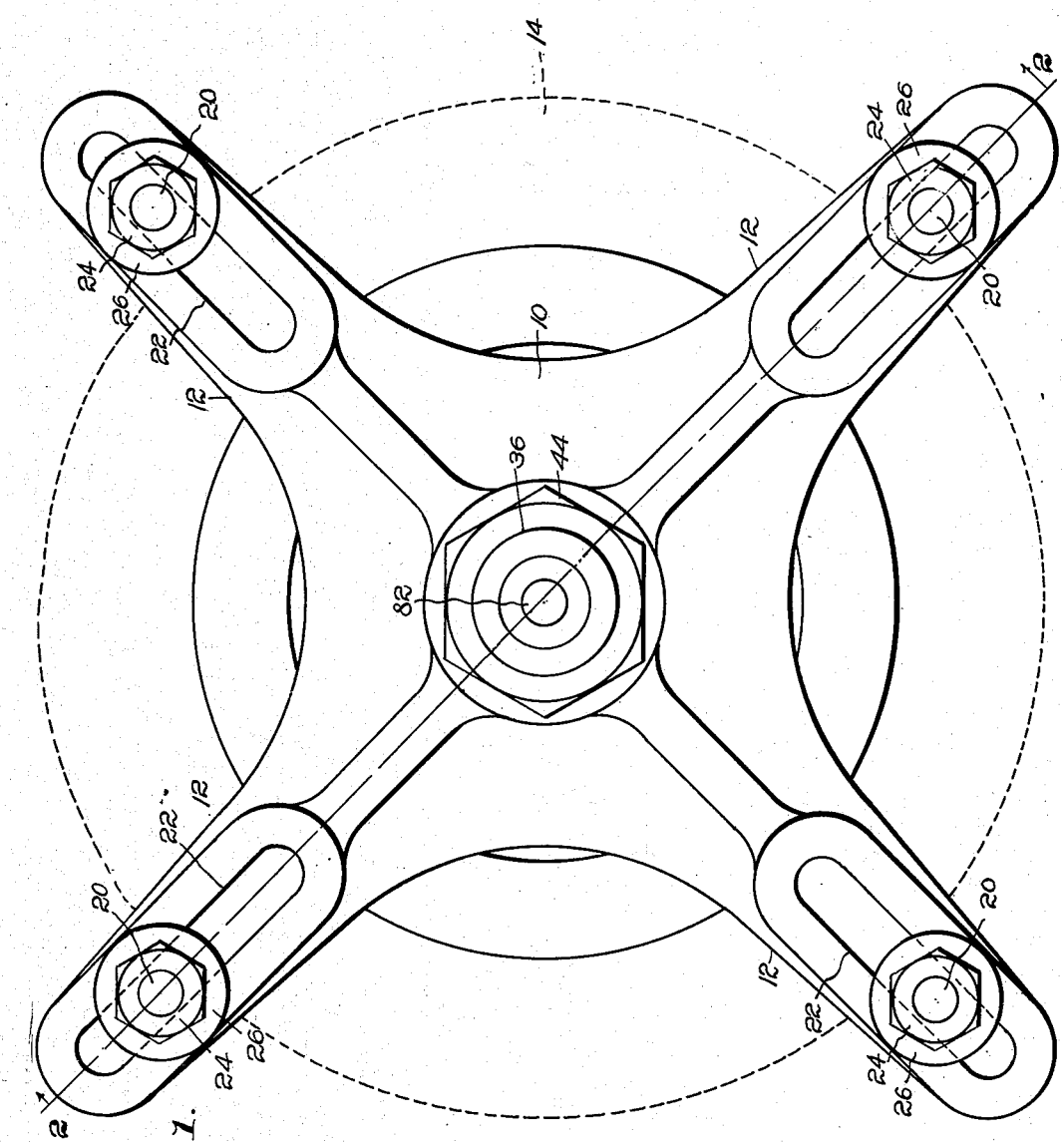
Fig. 1 is a plan of a portable lathe embodying the invention.
Figure 2:
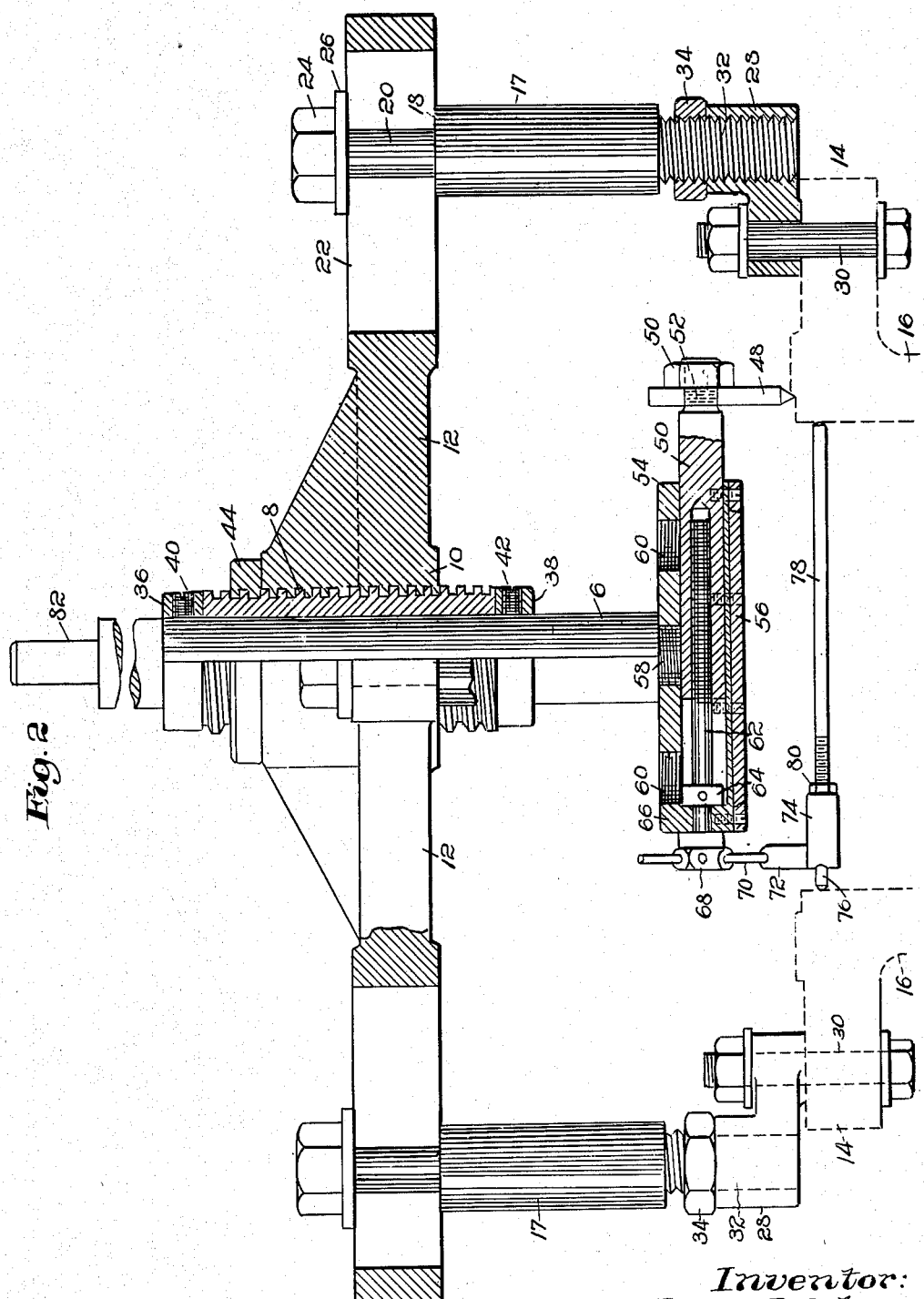
Fig. 2 is a vertical sectional view of the same on line 2—2 of Fig. 1.

Referring to the drawings and to the embodiment of the invention illustrated therein as an example, there is shown a portable lathe comprising a spindle 6, a spindle bearing in the nature of a sleeve 8, and a spindle support such as a spider 10 having a suitable number of radial arms 12, herein 4, for attachment to a flange 14 of a pipe 16. One convenient means of attachment comprises a set of studs 17, adjustably secured at their upper ends to the spider arms 12 as by providing the studs with shoulders 18 which the arms rest upon, and with reduced portions 20 extending upwardly through radial slots 22 in the arms and threaded to receive nuts 24 seated on washers 26 upon the arms. Thus, the studs are radially adjustable, or conversely, the spider 10 is radially adjustable and thus may be centered with relation to the work.

The lower ends of the studs 17 are provided with appropriate adjustable means for attachment to the pipe flange 14, as by feet 28 secured to the flange as by bolts 30 passing through the holes customarily provided in the flanges to secure a flange of one pipe to a flange of another pipe. In fact, the bolts 30 may be the same as those used for fastening the flanges together. The feet are attached to the studs as by providing the studs with reduced portions 32 threaded into the feet 28 and provided with locknuts 34 seated upon the feet. Thus, the studs may be individually adjusted vertically to bring the cutting plane of the tool into parallelism with the face of the work to be finished. By turning the feet about the axes of the studs, the feet may be adjusted to bring the bolts 30 into registration with the holes in the flange 14. Thus the spider is adjustable in every needed direction with relation to the work.

The spindle 6 is maintained in its proper axial relationship to the sleeve 8 as by upper and lower collars 36 and 38 secured as by set screws 40 and 42 to the spindle. The bearing sleeve 8 is adjustable axially as by threading the same into the spider and providing a lock-nut 44 threaded on the sleeve and seated upon a hub or boss 46, through which the sleeve extends. Thus, the spindle may be adjusted axially toward and from the work by axial adjustment of the bearing sleeve.

The lower end of the spindle carries a turning tool 48 movable radially as by a tool-holding carrier 50 to which the tool is secured as by a nut 51 threaded into a stem 52 bifurcated or slotted to receive the tool. The tool carrier, in this instance, is a slide which slides radially in a guide 54 having a cap 56 to hold the tool carrier in place. The guide is suitably secured to the lower end of the spindle 6 as by providing the latter with a threaded stem 58 screwed into one of a set of threaded holes 60, thus providing a means of adjusting the guide radially with relation to the spindle.

The tool-holding slide 50 is moved lengthwise in the guide 54 by appropriate mechanism which in the present example feeds the tool radially as the spindle turns. One such feed mechanism comprises a feed-screw 62 threaded into the slide 50 and held against axial displacement in the guide 54 as by collar 64 suitably formed on or affixed to the feed-screw and resting against a bearing 66 in which the feed-screw turns in the guide 54. The feed-screw is rotated by appropriate means such as a star wheel 68 affixed thereto and having arms 70 successively engaging a fixed member such as a lug 72 upstanding from a support 74 which, in this instance, is secured within the internal surface of the pipe 16 as by a stud 76 resting against one side of the pipe and a rod 78 resting against the other side of the pipe and threaded into the support 74, a lock-nut 80 being provided to maintain the rod in its proper radial adjustment.

The upper end of the spindle 6 is suitably driven as by being provided with a stem 82 to be inserted into the chuck of an electric or air drill. As the spindle rotates and carries the cutting tool round and round in contact with the work, the tool is fed radially across the work by the successive engagement of the star-wheel arms with the fixed lug, thus rotating the feed-screw step-by-step and moving the tool-carrier radially.

Having thus described one embodiment of the invention, what I claim is:

In a portable lathe having a spindle bearing and a spindle therein equipped to carry a tool for turning a face of flanged tubular workpieces such as pipe of the bolting flange type, an adjustable support to mount the lathe on a workpiece flange and to center, align, and axially adjust the spindle bearing with respect to the work, said support comprising a spindle bearing supporting spider having a plurality of radial arms each with a radial slot at the outer portion, each arm having a supporting stud paralleling the spindle bearing axis with a reduced neck received in the arm slot for relative sliding adjustment lengthwise of the arm, the studs each having a longitudinal threaded formation at the end remote from the spider, offset feet threaded for reception on the threaded formations of the corresponding studs and adjustable axially and angularly relative thereto, means for locking the feet in adjusted position on the studs, offset portions of the feet having apertures with axes paralleling the studs and adapted to align with bolting holes of a workpiece flange, and nut and bolt means for rigidly coupling the feet and such flange.

JAMES B. PETERS.

REFERENCES CITED

The following references are of record in the file of this patent:

UNITED STATES PATENTS

| Number | Name | Date |
|---|---|---|
| 836,715 | Smith | Nov. 27, 1906 |
| 1,138,423 | Swanberg | May 4, 1915 |
| 1,625,800 | Edwards | Apr. 26, 1927 |
| 1,795,323 | Wade | Mar. 10, 1931 |
| 2,211,134 | Kruell | Aug. 13, 1940 |

FOREIGN PATENTS

| Number | Country | Date |
|---|---|---|
| 68,208 | Germany | Mar. 12, 1892 |